Patented Apr. 5, 1927.

1,623,901

UNITED STATES PATENT OFFICE.

AUGUST AMANN AND EWALD FONROBERT, OF WIESBADEN, GERMANY, ASSIGNORS TO THE FIRM CHEMISCHE FABRIKEN DR. KURT ALBERT, G. M. B. H., OF AMÖNEBURG, NEAR BIEBRICH-ON-THE-RHINE, GERMANY.

METHOD FOR THE IMPROVEMENT OF NATURAL RESINS.

No Drawing. Application filed February 4, 1924, Serial No. 690,650, and in Germany August 18, 1917.

It has been known that one can improve saponifiable fresh natural resins by combining the acid groups of these resins with alkalis or alcohols. Such resinous bodies, generally produced from colophony, are considerably more resistant than the corresponding unchanged natural resins. Varnishes made with these resinous bodies are, however, not so weatherproof as varnishes made with fossil copals.

It has further been known that one can improve fresh natural resins by melting them together with artificial resins obtained from phenols and aldehydes. But, depending on the quantity of colophony employed or of the other acid natural resin which has been used, such resins still possess to a certain degree the bad properties of these resinous acids of being very easily saponified by alkalis and of causing oil varnishes made with them to coagulate upon the addition of basic pigments like zinc oxide.

We now have found that by a combination of the above mentioned known methods for improving fresh natural resins, resinous bodies of very high value are obtained when fresh natural resins are reacted upon in the following manner: First, the fresh natural resin is reacted upon with a reaction product of a phenolic body and a substance containing at least one carbonyl group. By the expression "reaction product of a phenolic body and a substance containing at least one carbonyl group" we wish to include all the products obtained from the reaction between phenol, its homologues and phenol derivatives, with carbonyl compounds, e. g., aldehydes and ketones, these products being crystallized or liquid substances, as well as resins always remaining fusible, or resins becoming infusible on being heated alone, or resins made already more or less infusible.

The resinous bodies obtained by the methods mentioned above are then neutralized by esterification preferably with suitable alcohols. The ratio of phenol carbonyl condensation product and of natural resins respectively may be varied within a wide range, and the resin acids may be converted into various esters or resinates; in any case a resin with a high melting point is obtained which is extraordinarily resistant against mechanical influences, which is soluble in fatty oils and very well adapted for manufacturing high graded varnishes and for other technical or medicinal or pharmaceutical purposes. The resultant resins differ in many respects from the known products obtained by the esterification of colophony and similar resin acids. They are of much greater molecular weight, yield solutions of much greater viscosity, and compared with the known ester gums or glycerine esters of colophony, possess greater resistance to alkali, and the weathering influences to which varnishes are subjected.

It is already known, to melt phenol aldehyde resins together with resin esters, and to produce by this process resins, soluble in oil. But these products contain still free phenol hydroxyl groups so that they are not absolutely neutral resins. Moreover their molecular weight is not increased by the melting process. It further is known to neutralize part of the phenol hydroxyl groups of phenol aldehyde resins by treating the same with natural resin acids, but no neutral resins are obtained by this process in consequence of the large excess of resin acids which has to be used. The present process, however allows the manufacture of resinous bodies of a very high molecular weight and of a quite neutral character, the process comprising the steps of first reacting on fresh natural resins with a reaction product of a phenolic body and a substance containing at least one carbonyl group and thereafter neutralizing these reaction products with a substance such as glycerol.

Especially when alcohols with two or more hydroxyl groups as glycol and glycerol are used, these alcohols reacting on the resinous bodies obtained from the fresh natural resins and the phenol carbonyl compounds unite together at least two molecules of the said resinous bodies, forming in this way very resistant and stable products of a much greater molecular weight than the original substances possessed. By this fact the new process is essentially different from all known processes, soluble resins with molecular weights of unknown height being produced which possess much greater resistance to alkali and much greater hardness than the esters of natural resins. It is not possible to give exact or nearly exact formulæ for these new resins.

The new process allows one to improve the cheap natural resins like rosin or colophony with comparatively small quantities of phenol carbonyl compounds, subsequently neutralizing the resin acids in such a manner that artificial resins are produced which are, with regard to their mechanical properties, very similar to the fossil resins like kauri and congo copals, formed by being enclosed in the earth for hundreds of years, and which are even much superior to said fossil resins with regard to their chemical properties and which are superior to the known ester gums or glycerine esters of colophony in that they possess increased resistance to alkali, greater hardness and higher melting points.

The oily or crystallized phenol alcohols are especially suitable to be employed as phenol carbonyl condensation products for the present purposes, because they, when being heated alone, do not become so quickly infusible as the generally known phenol formaldehyde resins; by this property it is possible to add them to molten resins, even at temperatures above 100° C. without danger of their becoming infusible.

It is very surprising that the resins obtained by this process from fresh natural resins, like colophony and phenol alcohols, are much more easily soluble in linseed oil, wood oil, etc. and in benzine or turpentine, than the corresponding resins made by heating colophony with phenol formaldehyde resins, even if the same amount of phenol and formaldehyde is used in both processes.

As carbonyl compounds for reacting on the phenolic bodies, all aldehydes, as formaldehyde, acetaldehyde and their polymerized derivatives, and all ketones, as acetone, and its aliphatic, aromatic and mixed homologues like methylethylketone, dibenzylketone and the like may be used.

For the reaction on fresh natural resins, synthetic resins which have been produced by first combining a phenolic body with a ketone and then with formaldehyde have proved to be especially adapted for manufacturing resinous bodies of very high value.

As fresh natural resins all resins with a high percentage of resin acids may be used.

For the esterification of the resin acids any alcohol uniting with a carbonyl group can be used.

The process can be varied in many ways. The phenolaldehyde condensation products obtained in any suitable manner can be melted together with the natural resins and then be neutralized, or they may be produced in the presence of the natural resins. The several steps of the process can be carried out at ordinary, increased or reduced pressure. For the esterification of the phenolic hydroxyl groups the resin acids of the natural resins as well as any other body adapted for esterification may be used.

The following examples shall show more clearly the new process:

*Example No. 1.*—100 parts of crude cresol are heated with 400 parts of colophony and 40 parts of formaldehyde (100%) until the cresol has entirely disappeared and a tough resinous mass has been produced which remains clear in the cold. The non-combined volatile parts are then distilled off together with the water formed by the condensation. The temperature is then raised to about 250° C. and 50 parts of glycerol of 28° Bé. are gradually added, care being taken that the mixture is well stirred while adding the glycerol. After the addition of the glycerol, the mixture is still heated several hours at 250 to 260° C., while stirring, in order to complete the reaction.

*Example No. 2.*—100 parts of phenol aldehyde resin difficultly fusible and only partly soluble in benzol and other solvents, and produced for instance by heating 108 parts of cresol with 60 to 75 parts of formaldehyde (30% by weight) and distilling off the water and the uncombined cresol, are added gradually to 800 parts of melted colophony. The whole mixture is then heated in an autoclave until a resin is produced which is clear in the cold, homogeneous and free from smell of phenol. The volatile substances are then removed while stirring and 100 parts of glycerol of 28° Bé. are added in small quantities, whereupon the mixture is heated to 250° C. and kept at this temperature for several hours while being stirred carefully.

Instead of glycerol the equivalent quantity of any other alcohol with two or more hydroxyl groups may be employed as for instance glycol, arabite and the like.

*Example No. 3.*—100 parts of a phenol resin as described in Example No. 2 are esterified by boiling with 20 parts of acetic acid anhydride. The excess of the acetic acid anhydride, and the acetic acid formed by the esterification are driven off by known methods. The remaining resin is melted together with the same quantity of colophony and esterified as indicated in Example No. 1 with glycerol or the like.

*Example No. 4.*—100 parts of a phenol resin as described in Example No. 2 are treated with 50 parts of colophony and 80 parts of acetic acid anhydride whereupon the resin obtained after distilling off the volatile substances is again heated with 50 parts of colophony and esterified, in the known manner, with glycerol.

*Example No. 5.*—100 parts of a product obtained by the combination of phenol, acetone and formaldehyde are carefully and in small portions added to 600 parts of melted colophony. The whole mass is then heated in an autoclave at a temperature of 100° to 250° C. until a homogeneous resin is obtained which remains clear in the cold. The volatile parts are then distilled off while stirring, and 60 parts of glycerol of 28° Bé. are added in small quantities, the mixture then being heated again to 250° C. and kept at this temperature until the esterification is completed. Instead of glycerol any other alcohol may be employed.

The use of the condensation products from phenols with ketones and formaldehyde has proved to be of special value for the indicated purpose, these products showing a very good lightfastness.

*Example No. 6.*—100 parts of colophony are first heated with 10 parts of p-cresoldialcohol (prepared for instance from p-cresol and formaldehyde as described in the Berichte d. Deutsch. Chem. Ges., 1909, page 2540) for 10 hours at 80° to 90° C. and then at a gradually rising temperature up to 150° C. During this time the melting point of the mixture rises slowly from 60°–70° C. to 100–110° C. The product obtained is soluble in alcohol and benzine, but in benzine only if a concentrated solution is made containing 50% or more of resin. It is then esterified by known methods with glycerol, glycol or the like.

*Example No. 7.*—100 parts of a product obtained from one molecule of phenol and six molecules of formaldehyde are heated with 600 parts of colophony. In the beginning the mixture is heated for some hours at 100–120° C., then for several hours at 180° C. and finally for some time at 200–250° C. The reaction is finished when the melting point does not rise further and the formation of foam ceases. The esterification is then practised by the usual methods as described in the first examples.

The proportions by weight may be varied. Depending upon the quantity of colophony, or of the other fresh natural acid resin which is used, products are obtained with properties being more or less similar to copals or generally to fossil natural resins of high value.

The whole process may go on under ordinary or increased pressure, in an autoclave or in vacuum, in the presence of the air or in the presence of indifferent gases. If sufficient care is taken, very light resins which nevertheless possess a high melting point may easily be obtained.

Certain of the intermediate reaction products herein disclosed are covered by the sole application of August Amann, Serial No. 143,016, filed October 20, 1926.

Having now particularly described and ascertained the nature of our said invention, we declare that what we claim is:

1. The process of producing resinous bodies which comprises the steps of reacting on a natural resin of acidic character with a reaction product of a phenolic body and a substance containing at least one carbonyl group, and thereafter esterifying the resulting product with a polyhydric alcohol.

2. A process as defined in claim 1 in which the reaction product of a phenolic body and a substance containing at least one carbonyl group is a phenol-poly-alcohol.

3. A resinous material comprising a natural resin of acidic character treated with the reaction product of a phenolic body and a substance containing at least one carbonyl group and then esterified with a polyhydric alcohol.

In testimony whereof we have hereunto set our hands.

Dr. AUG. AMANN.
Dr. EWALD FONROBERT.